US007701453B2

(12) United States Patent
Lin et al.

(10) Patent No.: US 7,701,453 B2
(45) Date of Patent: Apr. 20, 2010

(54) DRIVING DEVICE AND RELATED IMAGE TRANSMISSION DEVICE OF A FLAT PANEL DISPLAY

(75) Inventors: Jr-Ching Lin, Kao-Hsiung (TW); Che-Li Lin, Taipei (TW)

(73) Assignee: NOVATEK Microelectronics Corp., Hsin-Chu (TW)

( * ) Notice: Subject to any disclaimer, the term of this patent is extended or adjusted under 35 U.S.C. 154(b) by 693 days.

(21) Appl. No.: 11/610,504

(22) Filed: Dec. 14, 2006

(65) Prior Publication Data

US 2008/0094339 A1 Apr. 24, 2008

(30) Foreign Application Priority Data

Oct. 19, 2006 (TW) .............................. 95138613 A

(51) Int. Cl.
*G06F 3/038* (2006.01)
*G09G 5/00* (2006.01)
*H04B 1/02* (2006.01)
*H04B 1/04* (2006.01)

(52) U.S. Cl. .......................... 345/204; 455/91; 455/103

(58) Field of Classification Search ......... 330/252–261; 326/83; 455/91–129; 345/204
See application file for complete search history.

(56) References Cited

U.S. PATENT DOCUMENTS 6,118,438 A 9/2000 Ho
2004/0242171 A1* 12/2004 Hosokawa et al. ....... 455/127.1

FOREIGN PATENT DOCUMENTS

CN 1574633 A 2/2005

* cited by examiner

*Primary Examiner*—Bipin Shalwala
*Assistant Examiner*—Ilana Spar
(74) *Attorney, Agent, or Firm*—Winston Hsu

(57) ABSTRACT

A driving device includes a plurality of transmitters. Each transmitter includes a first current source, a second current source, a third current source, a fourth current source, a first switch, a second switch, a third switch, a fourth switch, a fifth switch, and a sixth switch. The first and the fourth switches are controlled by a first control signal. The second and the third switches are controlled by a second control signal. The second switch is coupled to the first switch. The third switch is coupled to the first current source. The fourth switch is coupled to the third switch and the second current source. The fifth and the sixth switches are controlled respectively by a third and a fourth control signal. The fifth switch is coupled to the third current source and the first switch. The sixth switch is coupled to the second switch and the fourth current source.

20 Claims, 14 Drawing Sheets

| Data[1] | Data[0] | Clock | SC1/SC2 | SC5/SC6 | SC3/SC7 | SC4/SC8 |
|---|---|---|---|---|---|---|
| 1 | 1 | 1 | H/L | H/L | H/L | H/L |
| | | 0 | | L/H | | |
| 0 | 0 | 1 | L/H | H/L | H/L | H/L |
| | | 0 | | L/H | | |
| 1 | 0 | 1 | H/L | H/L | L/H | L/H |
| | | 0 | | L/H | | |
| 0 | 1 | 1 | L/H | H/L | L/H | L/H |
| | | 0 | | L/H | | |

Fig. 13

DRIVING DEVICE AND RELATED IMAGE TRANSMISSION DEVICE OF A FLAT PANEL DISPLAY

BACKGROUND OF THE INVENTION

1. Field of the Invention

The present invention relates to a driving device and related image transmission device of a flat panel display, and more particularly, to a driving device and related image transmission device utilizing a plurality of drivers and an encoding unit to transmit data at the same time.

2. Description of the Prior Art

Liquid crystal display (LCD) devices are flat panel displays characterized by thin appearance, low radiation and low power consumption. LCD devices have gradually replaced traditional cathode ray tube (CRT) displays, and been widely applied in various electronic products such as notebook computers, personal digital assistants (PDAs), flat panel televisions, or mobile phones.

An LCD device usually includes an LCD panel, a timing controller, a gate driver, and a source driver. The timing controller is used for generating image data signals, together with control signals and timing signals for driving the LCD panel. The gate driver is used for generating scan signals for turning on and off the pixel circuits, and the source driver is used for generating driving signals based on the image data signals, the control signals and the timing signals.

For displaying images correctly, various signals are transmitted from the timing controller to the source driver via a transmission interface. Common transmission interfaces used in an LCD device include transistor-transistor logic (TTL) interfaces, reduced swing differential signal (RSDS) interfaces, low voltage differential signal (LVDS) interfaces, and mini low voltage differential signal (mini-LVDS) interfaces, etc.

Please refer to FIG. 1. FIG. 1 is a diagram of an external connection condition of a driving device 10 of a flat panel display according to the prior art. The driving device 10 includes a transmitter TX which has a first output node TXA1 and a second output node TXB1. The transmitter TX further includes two terminal resistors $RT_1$ externally connected, which are coupled between the first output node TXA1 and the second output node TXB1 in series. A common voltage $V_{COM}$ exists between the first output node TXA1 and the second output node TXB1. When a current I is outputted from the first output node TXA1 by the transmitter TX, the current I flows through a node A, the two terminal resistors $RT_1$, a node B in order, and then back to the second output node TXB1 to form a loop. Similarly, when the current I is outputted from the second output node TXB1 by the transmitter TX, the current I flows through the node B, the two terminal resistors $RT_1$, the node A in order, and then back to the first output node TXA1 to form a loop. The driving device 10 is capable of carrying a data amount of two bits within a clock period due to a voltage level of the node A being different from a voltage level of the node B at the same time.

Please refer to FIG. 2 and FIG. 1. FIG. 2 is a diagram of the voltage level of the node A in FIG. 1. The voltage level of the node A has a center being the common voltage $V_{COM}$ and an amplitude of vibration being $(I\times RT_1)$. Thus, the voltage level of the node A can be expressed in equations $V(A)=V_{COM}+(I\times RT_1)$ or $V(A)=V_{COM}-(I\times RT_1)$.

Please refer to FIG. 3 and FIG. 1. FIG. 3 is a diagram of the voltage level of the node B in FIG. 1. The voltage level of the node B has a center being the common voltage $V_{COM}$ and an amplitude of vibration being $(I\times RT_1)$. Thus, the voltage level of the node B can be expressed in equations $V(B)=V_{COM}-(I\times RT_1)$ or $V(A)=V_{COM}+(I\times RT_1)$. The transmitter TX is capable of carrying a data amount of two bits within a clock period due to the voltage level of the node A being different from the voltage level of the node B at the same time.

Please refer to FIG. 4 and FIG. 1. FIG. 4 is a diagram illustrating an internal current driving manner of the transmitter TX in FIG. 1. The transmitter TX includes a first current source 42, a second current source 44, a first switch SW1, a second switch SW2, a third switch SW3, and a fourth switch SW4. The transmitter TX includes the first output node TXA1 located between the first switch SW1 and the second switch SW2, and the second output node TXB1 located between the third switch SW3 and the fourth switch SW4. The transmitter TX further includes two terminal resistors $RT_1$ externally connected, which are coupled between the first output node TXA1 and the second output node TXB1 in series (please refer to FIG. 1). The first current source 42 is coupled to a supply voltage terminal VCC for providing the current I, and the second current source 44 is coupled to a system ground terminal GND for providing a current having the same magnitude but opposite electrode with the current I. The first switch SW1 is coupled to the first current source 42, and the second switch SW2 is coupled between the first switch SW1 and the second current source 44. The third switch is coupled to the first current source 42 and to the first switch SW1, and the fourth switch SW4 is coupled between the third switch SW3 and the second current source 44. The first switch SW1 and the fourth switch SW4 are controlled by a first control signal SC1, and the second switch SW2 and the third switch SW3 are controlled by a second control signal SC2. The first control signal SC1 and the second control signal SC2 are complementary signals.

Please keep referring to FIG. 4. The first switch SW1 and the fourth switch SW4 are turned on and the second switch SW2 and the third switch SW3 are turned off when the first control signal SC1 is high level and the second control signal SC2 is low level. The supply voltage VCC outputs the current I, and then the current I flows through the first switch SW1 and draws out from the first output node TXA1. The current I flows into the second output node TXB1 through external termination resistors $RT_1$ (please refer to FIG. 1) and then flows through the fourth switch SW4. Finally, the current I flows into the system ground terminal GND to form a current loop. Oppositely, the first switch SW1 and the fourth switch SW4 are turned off and the second switch SW2 and the third switch SW3 are turned on when the first control signal SC1 is low level and the second control signal SC2 is high level. The supply voltage VCC outputs the current I, and then the current I flows through the third switch SW3 and draws out from the second output node TXB1. The current I flows into the first output node TXA1 through external termination resistors $RT_1$ (please refer to FIG. 1) and then flows through the second switch SW2. Finally, the current I flows into the system ground terminal GND to form a current loop.

Common transmission interfaces used in driving chips inside flat panel displays usually adopt transistor-transistor logic (TTL) interfaces, reduced swing differential signal (RSDS) interfaces, low voltage differential signal (LVDS) interfaces, and mini low voltage differential signal (mini-LVDS) interfaces, etc. Disadvantages of the transmission interfaces include causing signal de-skew easily, adjusting setup time/hold time difficultly, raising clock rate/data rate difficultly, and not conforming to demands of high resolution panels. Also, the sizes of LCD panels also grow larger with increasing demands for larger-sized applications. Since the image data signals and the clock signals are transmitted separately, as a result, the prior art LCD devices need more signals lines, which further complicates the circuit layout. Furthermore, setup pins of the driving chips will occupy input pins of the driving chips which causes pin gaps to be smaller, lowers yield rates of factories, and increases costs of panel manufacturing.

SUMMARY OF THE INVENTION

The claimed invention provides a driving device of a flat panel display. The driving device includes a plurality of transmitters. Each transmitter includes a first current source, a second current source, a third current source, a fourth current source, a first switch, a second switch, a third switch, a fourth switch, a fifth switch, and a sixth switch. The first current source is used for providing a first current. The second current source is used for providing a second current. The third current source is used for providing a third current. The fourth current source is used for providing a fourth current. The first switch is controlled by a first control signal. The second switch is coupled to the first switch and controlled by a second control signal. The third switch is coupled to the first current source and controlled by the second control signal. The fourth switch is coupled between the third switch and the second current source and controlled by the first control signal. The fifth switch is coupled between the third current source and the first switch and controlled by a third control signal. The sixth switch is coupled between the second switch and the fourth current source and controlled by a fourth control signal. The driving device further includes an encoding unit for generating the first control signal, the second control signal, the third control signal, and the fourth control signal according to a display data. The first control signal and the second control signal are complementary signals. The first current and the second current have the same magnitude but opposite electrodes. The third current and the fourth current have the same magnitude but opposite electrodes. The magnitude of the third current is not equal to the magnitude of the first current.

The claimed invention provides an image transmission device capable of carrying huge data amount. The image transmission device includes a timing controller, a driving device, and an encoding unit. The driving device includes a plurality of transmitters. Each transmitter includes a first current source, a second current source, a third current source, a fourth current source, a first switch, a second switch, a third switch, a fourth switch, a fifth switch, and a sixth switch. The first current source is used for providing a first current. The second current source is used for providing a second current. The third current source is used for providing a third current. The fourth current source is used for providing a fourth current. The first switch is controlled by a first control signal. The second switch is coupled to the first switch and controlled by a second control signal. The third switch is coupled to the first current source and controlled by the second control signal. The fourth switch is coupled between the third switch and the second current source and controlled by the first control signal. The fifth switch is coupled between the third current source and the first switch and controlled by a third control signal. The sixth switch is coupled between the second switch and the fourth current source and controlled by a fourth control signal. The encoding unit is coupled between the timing controller and the driving device for generating the first control signal, the second control signal, the third control signal, and the fourth control signal according to a display data of the timing controller. The first control signal and the second control signal are complementary signals. The first current and the second current have the same magnitude but opposite electrodes. The third current and the fourth current have the same magnitude but opposite electrodes. The magnitude of the third current is not equal to the magnitude of the first current.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 13 is a diagram illustrating the control signals in FIG. 11 and in FIG. 12.

DETAILED DESCRIPTION

Figure 1:
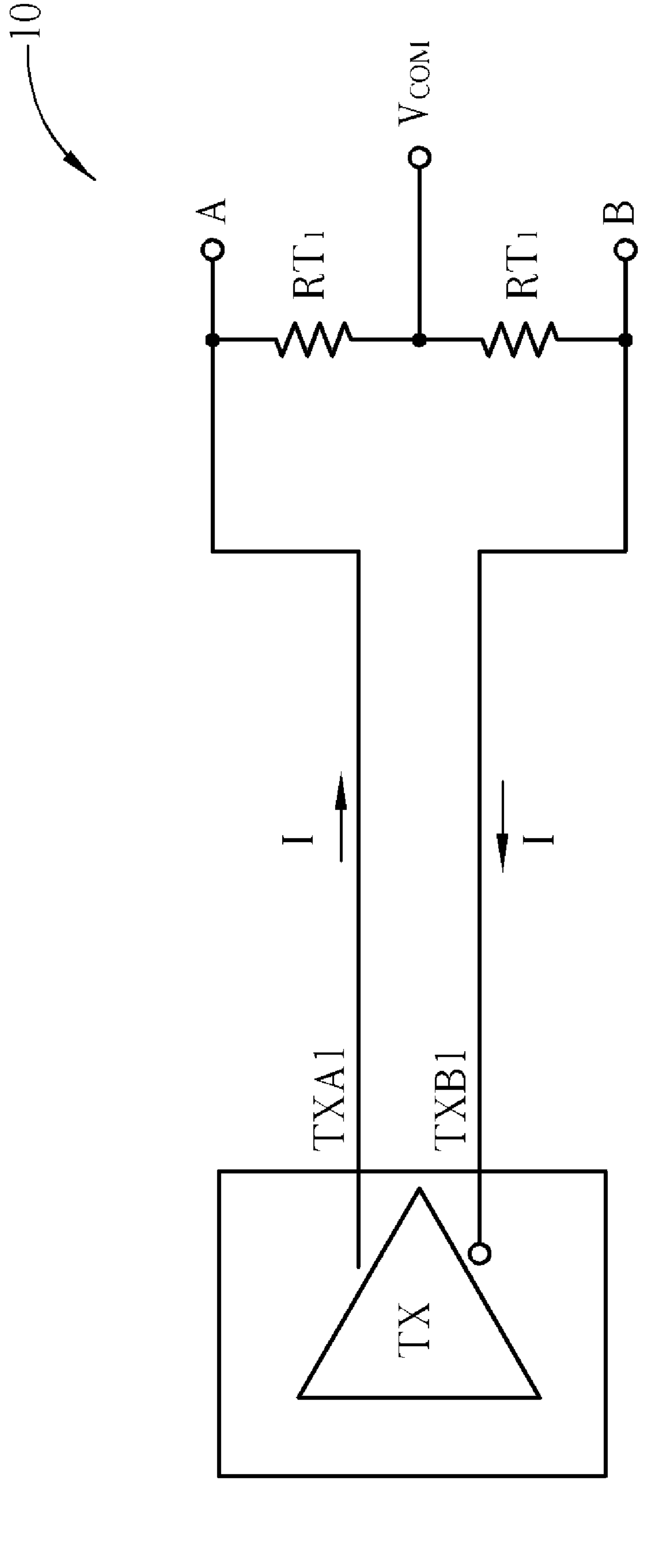
Fig. 1 Prior art
FIG. 1 is a diagram of an external connection condition of a driving device of a flat panel display according to the prior art.
Figure 2:
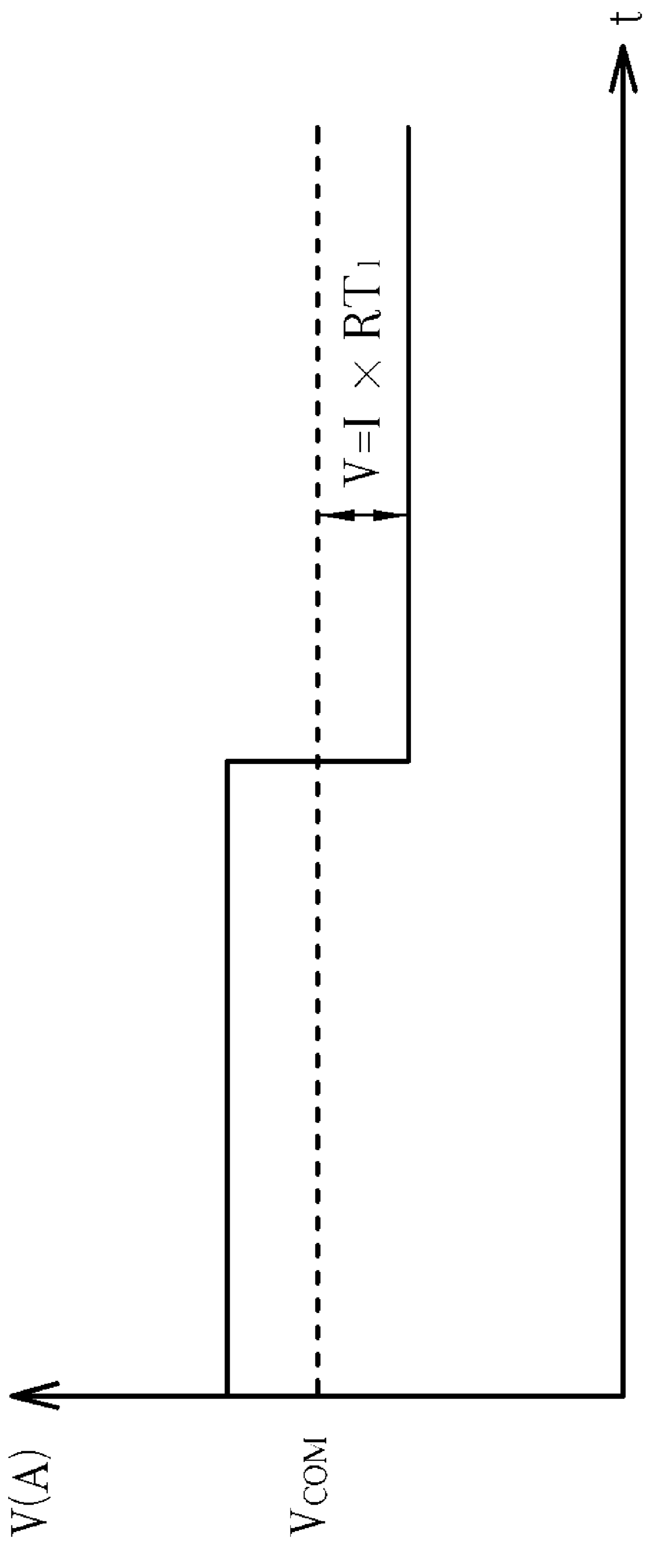
Fig. 2 Prior art
FIG. 2 is a diagram of the voltage level of the node A in FIG. 1.
Figure 3:
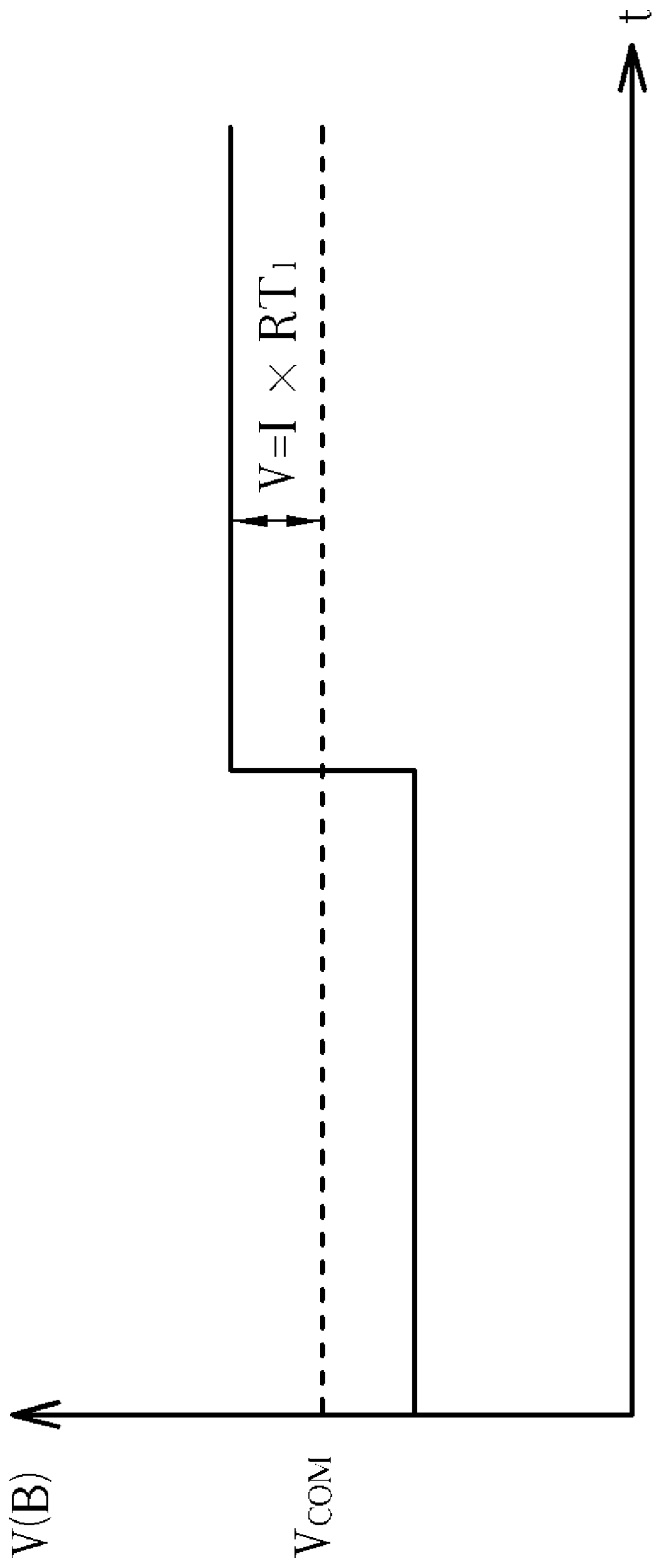
Fig. 3 Prior art
FIG. 3 is a diagram of the voltage level of the node B in FIG. 1.
Figure 4:
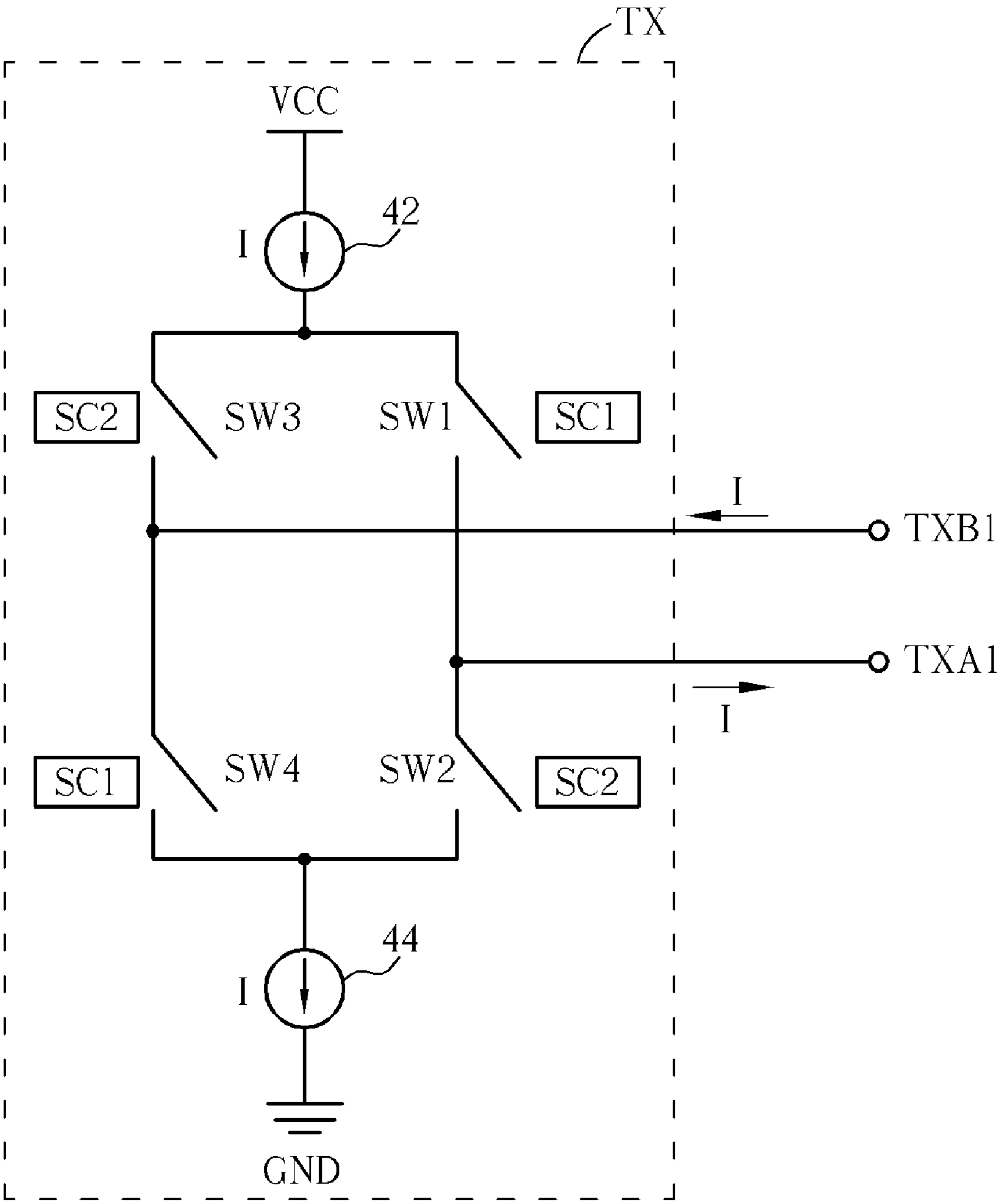
Fig. 4 Prior art
FIG. 4 is a diagram illustrating an internal current driving manner of the transmitter in FIG. 1.
Figure 5:
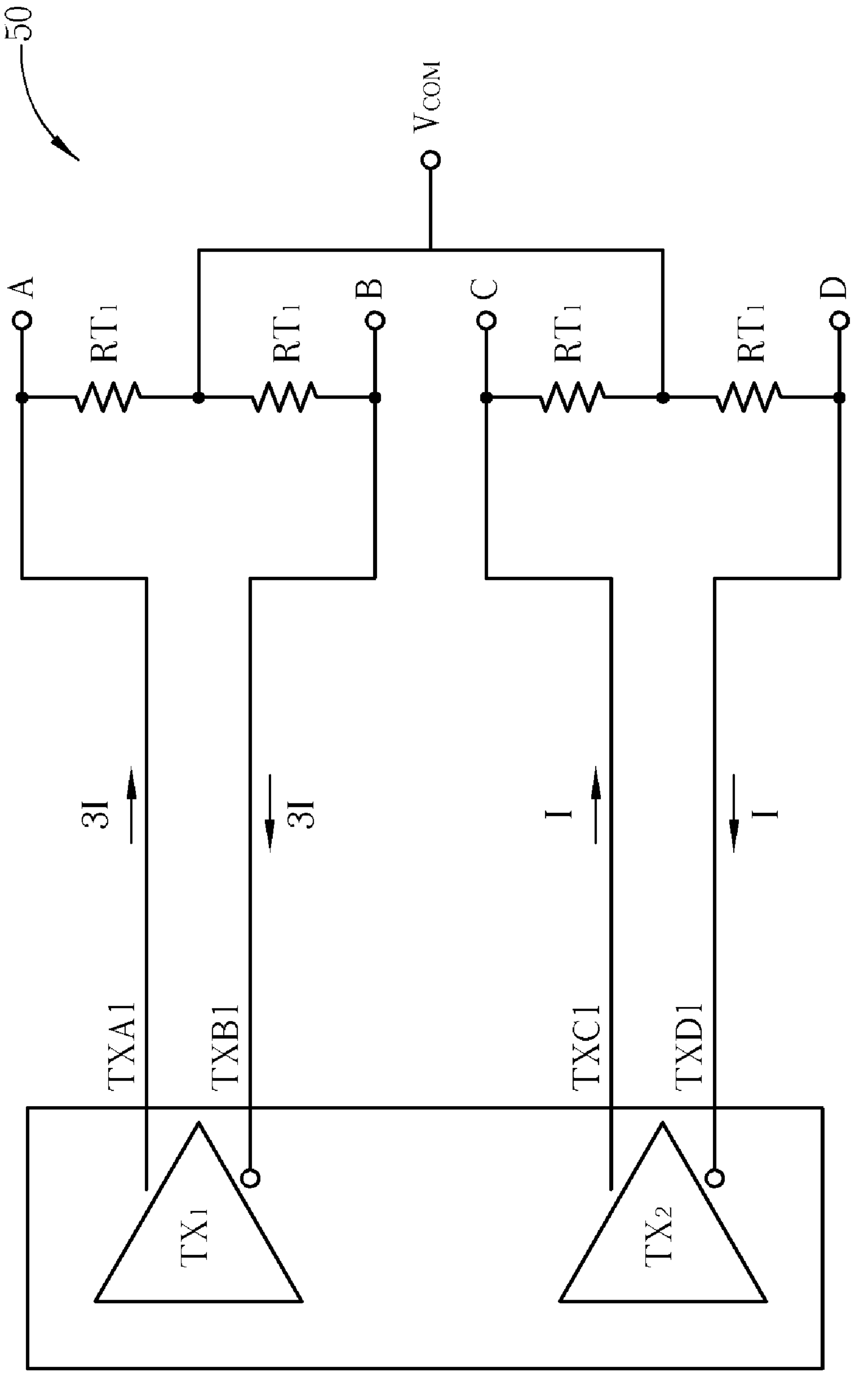
FIG. 5 is a diagram of an external connection condition of a driving device of a flat panel display according to an embodiment of the present invention.

Please refer to FIG. 5. FIG. 5 is a diagram of an external connection condition of a driving device 50 of a flat panel display according to an embodiment of the present invention. The driving device 50 includes a first transmitter $TX_1$ and a second transmitter $TX_2$. The first transmitter $TX_1$ has the first output node TXA1 and the second output node TXB1. The first transmitter $TX_1$ further includes two terminal resistors $RT_1$ externally connected which are coupled between the first output node TXA1 and the second output node TXB1 in series. The second transmitter $TX_2$ has a third output node TXC1 and a fourth output node TXD1. The second transmitter $TX_2$ further includes two terminal resistors $RT_1$ externally connected which are coupled between the third output node TXC1 and the fourth output node TXD1 in series. A common voltage $V_{COM}$ exists between the first output node TXA1 and the second output node TXB1. When a current 31 is outputted from the first output node TXA1 by the first transmitter $TX_1$, the current 31 flows through the node A, the two terminal resistors $RT_1$, the node B in order, and then back to the second output node TXB1 to form a loop. Similarly, when the current

31 is outputted from the second output node TXB1 by the first transmitter $TX_1$, the current 31 flows through the node B, the two terminal resistors $RT_1$, the node A in order, and then back to the first output node TXA1 to form a loop. The common voltage $V_{COM}$ exists between the third output node TXC1 and the fourth output node TXD1. When the current I is outputted from the third output node TXC1 by the second transmitter $TX_2$, the current I flows through a node C, the two terminal resistors $RT_1$, a node D in order, and then back to the fourth output node TXD1 to form a loop. Similarly, when the current I is outputted from the fourth output node TXD1 by the second transmitter $TX_2$, the current I flows through the node D, the two terminal resistors $RT_1$, the node C in order, and then back to the third output node TXC1 to form another loop. The driving device 50 is capable of carrying a data amount of four bits within a clock period due to a voltage level of the node A, a voltage level of the node B, a voltage level of the node C, and a voltage level of the node D being different from each other at the same time.

Figure 6:
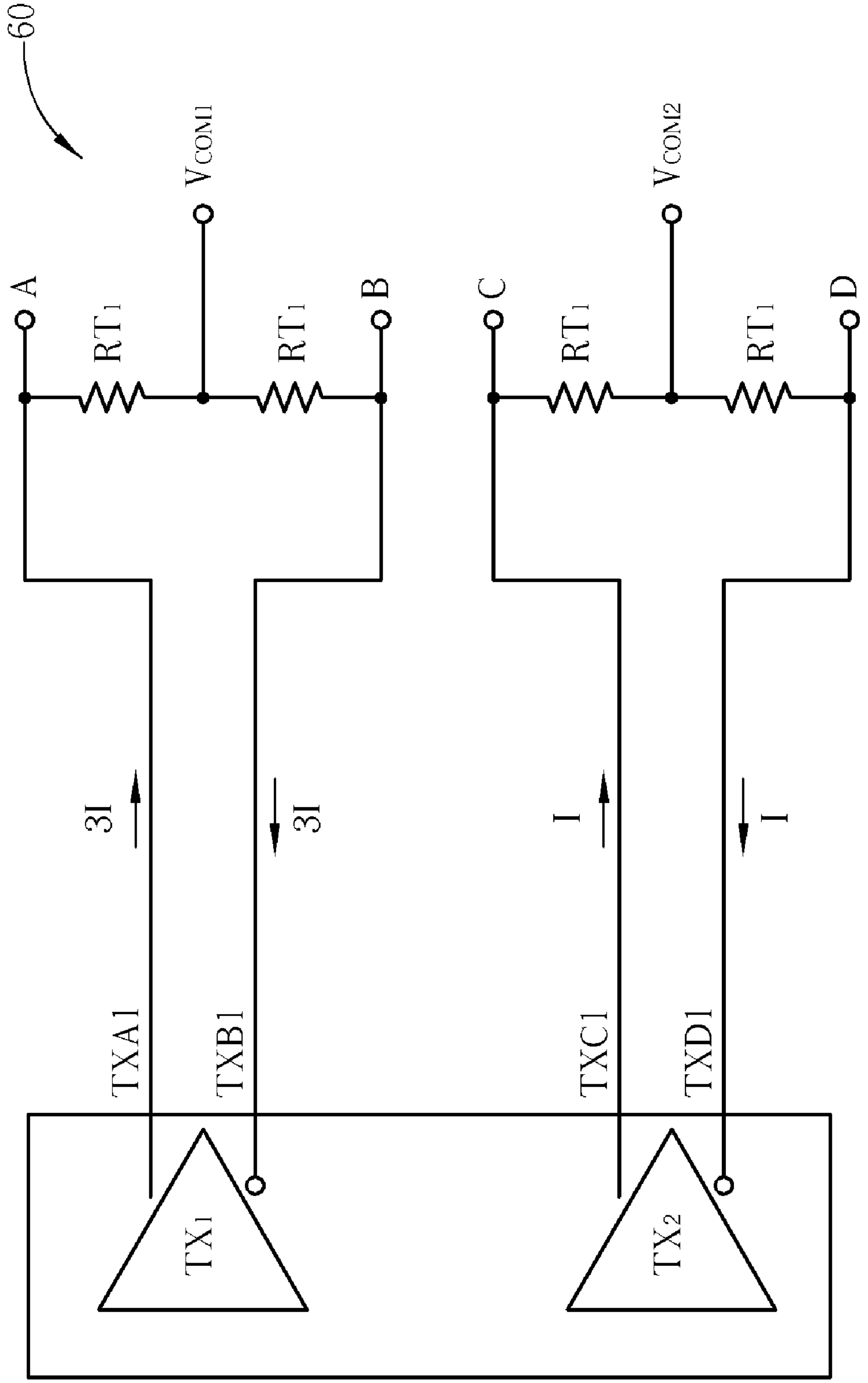
FIG. 6 is a diagram of an external connection condition of a driving device of a flat panel display according to another embodiment of the present invention.

Please refer to FIG. 6 and FIG. 5. FIG. 6 is a diagram of an external connection condition of a driving device 60 of a flat panel display according to another embodiment of the present invention. Please notice that a difference between the driving device 60 and the driving device 50 is that the first transmitter $TX_1$ and the second transmitter $TX_2$ of the driving device 60 have their own common voltages individually. A first common voltage $V_{COM1}$ exists between the first output node TXA1 and the second output node TXB1, and a second common voltage $V_{COM2}$ exists between the third output node TXC1 and the fourth output node TXD1.

Figure 7:
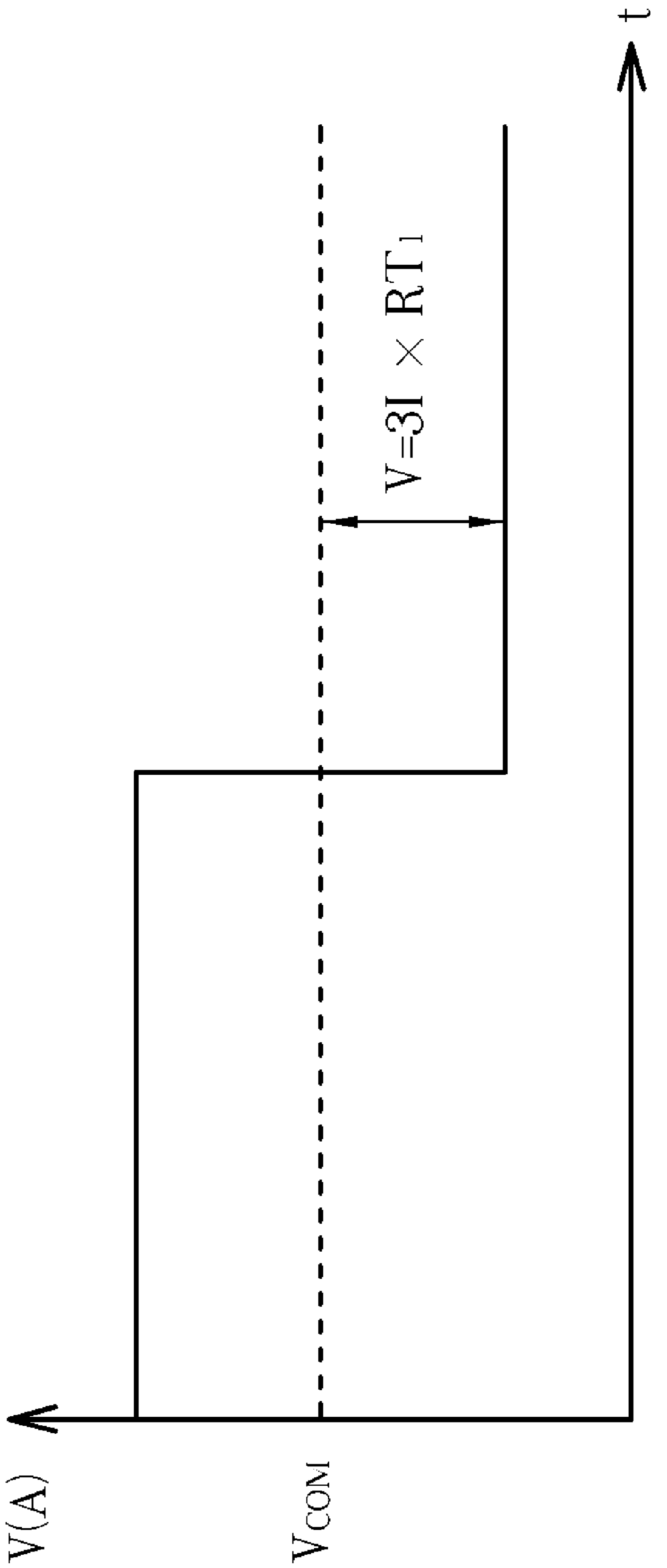
FIG. 7 is a diagram of the voltage level of the node A in FIG. 5.

Please refer to FIG. 7 and FIG. 5. FIG. 7 is a diagram of the voltage level of the node A in FIG. 5. The voltage level of the node A has a center being the common voltage $V_{COM}$ and an amplitude of vibration being $(3I\times RT_1)$. Thus, the voltage level of the node A can be expressed in equations $V(A)=V_{COM}+(3I\times RT_1)$ or $V(A)=V_{COM}-(3I\times RT_1)$.

Figure 8:
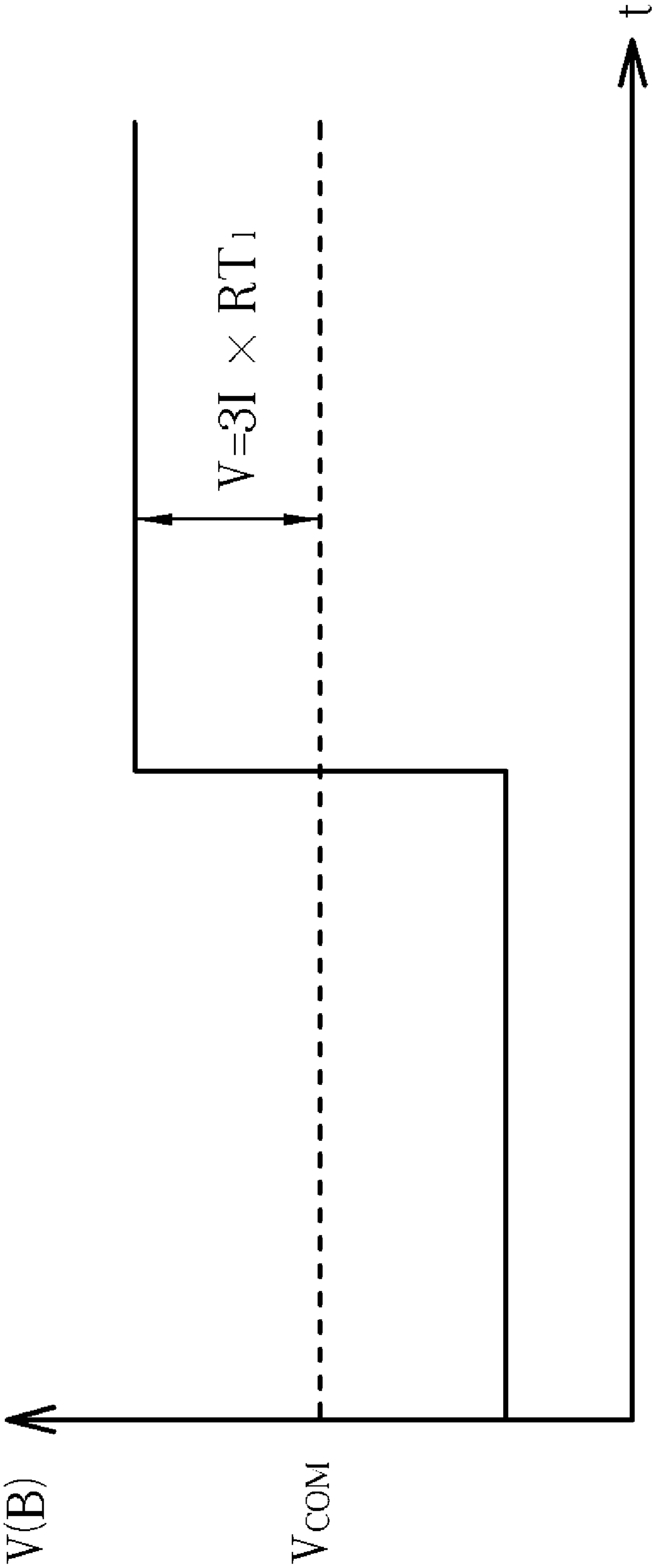
FIG. 8 is a diagram of the voltage level of the node B in FIG. 5.

Please refer to FIG. 8 and FIG. 5. FIG. 8 is a diagram of the voltage level of the node B in FIG. 5. The voltage level of the node B has a center being the common voltage $V_{COM}$ and an amplitude of vibration being $(3I\times RT_1)$. Thus, the voltage level of the node B can be expressed in equations $V(B)=V_{COM}-(3I\times RT_1)$ or $V(B)=V_{COM}+(3I\times RT_1)$.

Figure 9:
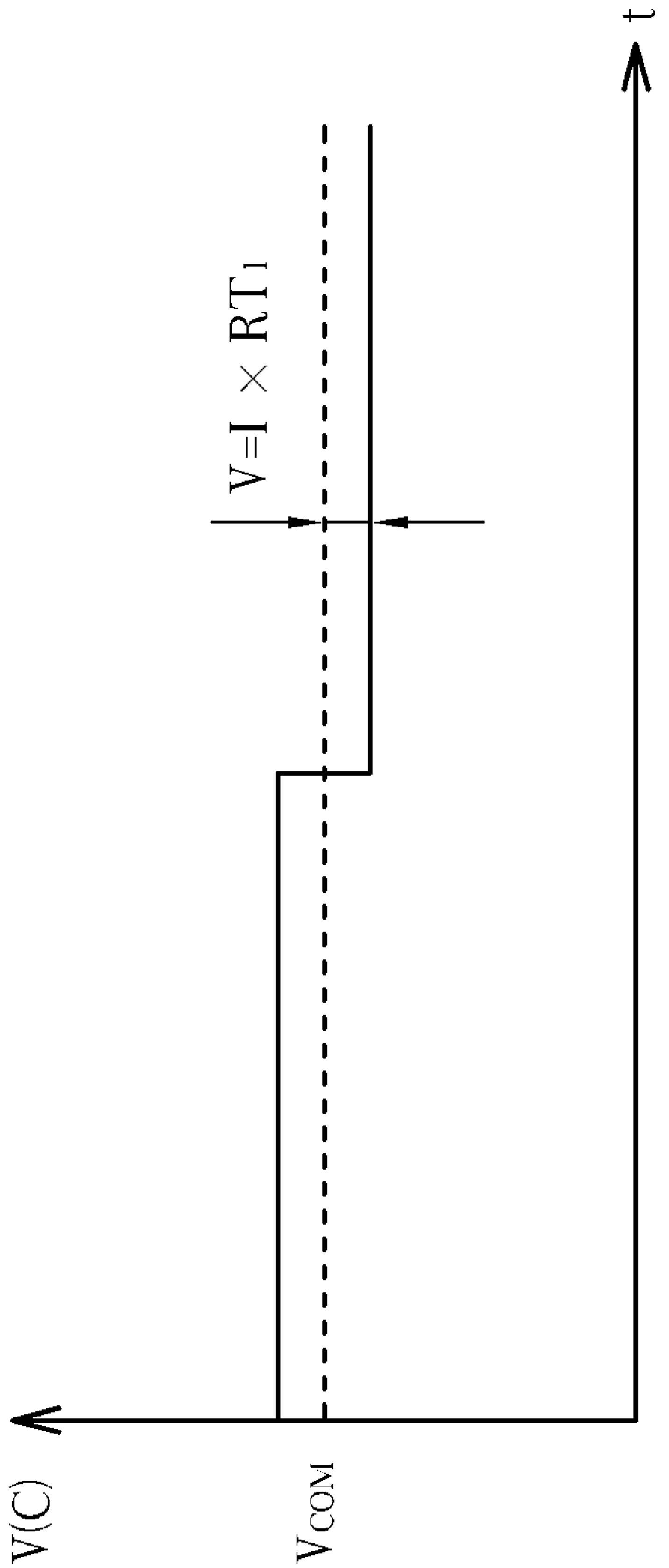
FIG. 9 is a diagram of the voltage level of the node C in FIG. 5.

Please refer to FIG. 9 and FIG. 5. FIG. 9 is a diagram of the voltage level of the node C in FIG. 5. The voltage level of the node C has a center being the common voltage $V_{COM}$ and an amplitude of vibration being $(I\times RT_1)$. Thus, the voltage level of the node C can be expressed in equations $V(C)=V_{COM}+(I\times RT_1)$ or $V(C)=V_{COM}-(I\times RT_1)$.

Figure 10:
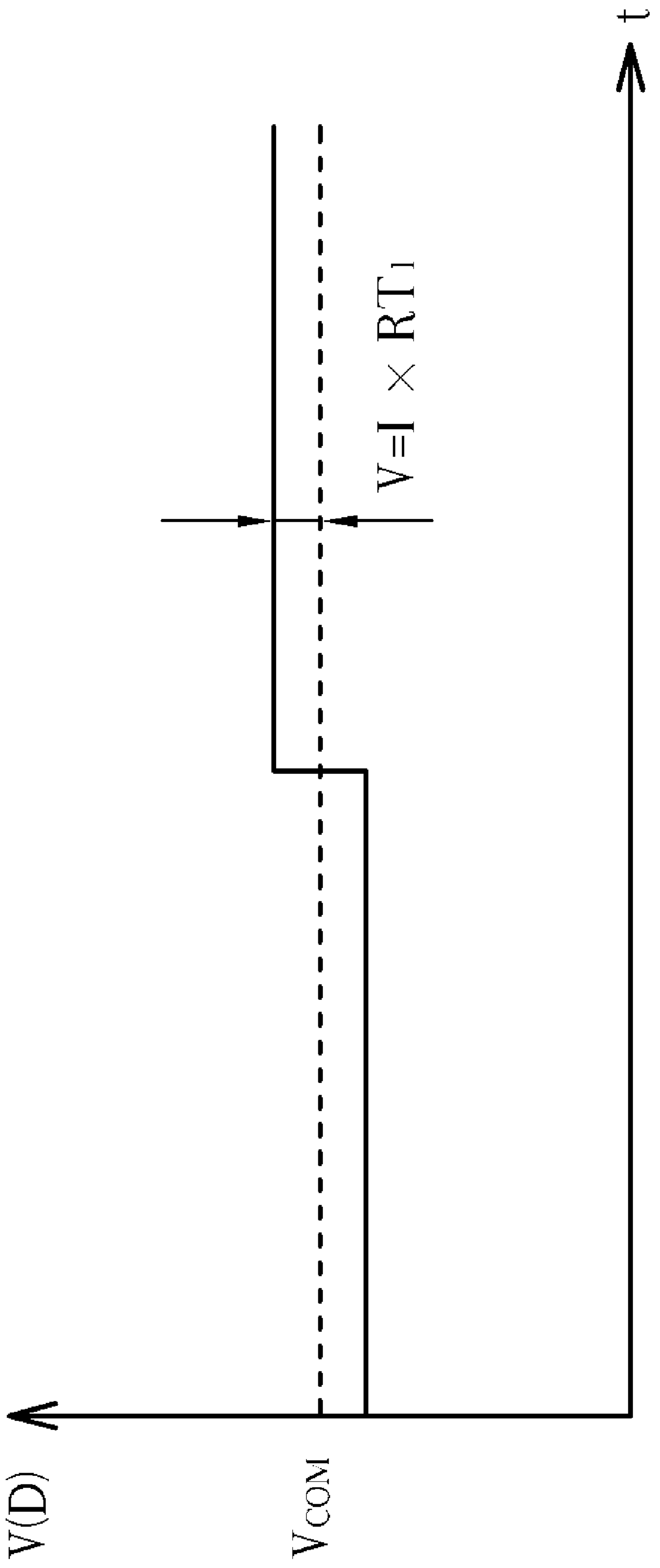
FIG. 10 is a diagram of the voltage level of the node D in FIG. 5.

Please refer to FIG. 10 and FIG. 5. FIG. 10 is a diagram of the voltage level of the node D in FIG. 5. The voltage level of the node D has a center being the common voltage $V_{COM}$ and an amplitude of vibration being $(I\times RT_1)$. Thus, the voltage level of the node D can be expressed in equations $V(D)=V_{COM}-(I\times RT_1)$ or $V(D)=V_{COM}+(I\times RT_1)$. The driving device 50 is capable of carrying a data amount of four bits within a clock period due to a voltage level of the node A, a voltage level of the node B, a voltage level of the node C, and a voltage level of the node D being different from each other at the same time.

Figure 11:
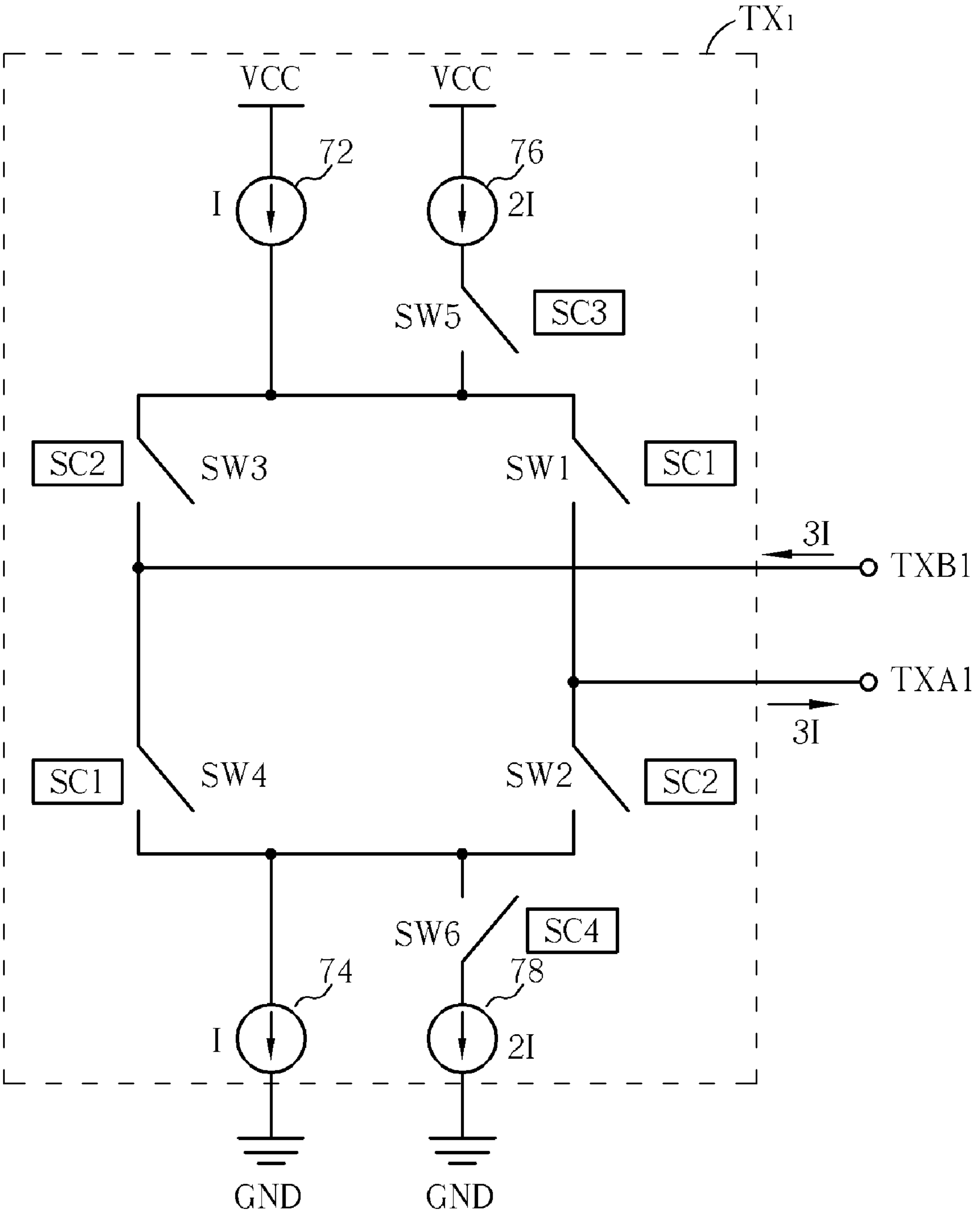
FIG. 11 is a diagram illustrating an internal current driving manner of the first transmitter in FIG. 5.

Please refer to FIG. 11 and FIG. 5. FIG. 11 is a diagram illustrating an internal current driving manner of the first transmitter $TX_1$ in FIG. 5. The first transmitter $TX_1$ includes a first current source 72, a second current source 74, a third current source 76, a fourth current source 78, a first switch SW1, a second switch SW2, a third switch SW3, a fourth switch SW4, a fifth switch SW5, and a sixth switch SW6. The first output node TXA1 is coupled between the first switch SW1 and the second switch SW2, and the second output node TXB1 is coupled between the third switch SW3 and the fourth switch SW4. The first current source 72 is coupled to the supply voltage terminal VCC for providing the current I, and the second current source 74 is coupled to the system ground terminal GND for providing a current having the same magnitude but opposite electrode with the current I. The third current source 76 is coupled to the supply voltage terminal VCC for providing a current 21, and the fourth current source 78 is coupled to the system ground terminal GND for providing a current having the same magnitude but opposite electrode with the current 21. The first switch SW1 is controlled by a first control signal SC1. The second switch SW2 is coupled to the first switch SW1 and is controlled by a second control signal SC2. The third switch SW3 is coupled to the first current source 72 and is controlled by the second control signal SC2. The fourth switch SW4 is coupled between the third switch SW3 and the second current source 74 and is controlled by the first control signal SC1. The fifth switch SW5 is coupled between the third current source 76 and the first switch SW1 and is controlled by a third control signal SC3. The sixth switch SW6 is coupled between the second switch SW2 and the fourth current source 78 and is controlled by a fourth control signal SC4. The first control signal SC1 and the second control signal SC2 are complementary signals.

Please keep referring to FIG. 11. The first switch SW1, the fourth switch SW4, the fifth switch SW5, and the sixth switch SW6 are turned on and the second switch SW2 and the third switch SW3 are turned off when the first control signal SC1, the third control signal SC3, and the fourth control signal SC4 are high level and the second control signal SC2 is low level. The supply voltage VCC outputs the current (I+2I), and then the current (I+2I) flows through the first switch SW1 and draws out from the first output node TXA1. The current (I+2I) flows into the second output node TXB1 through external termination resistors $RT_1$ (please refer to FIG. 5) and then flows through the fourth switch SW4. Finally, the current (I+2I) flows into the system ground terminal GND to form a current loop. Oppositely, the second switch SW2, the third switch SW3, the fifth switch SW5, and the sixth switch SW6 are turned on and the first switch SW1 and the fourth switch SW4 are turned off when the second control signal SC2, the third control signal SC3, and the fourth control signal SC4 are high level and the first control signal SC1 is low level. The supply voltage VCC outputs the current (I+2I), and then the current (I+2I) flows through the third switch SW3 and draws out from the second output node TXB1. The current (I+2I) flows into the first output node TXA1 through external termination resistors $RT_1$ (please refer to FIG. 5) and then flows through the second switch SW2. Finally, the current (I+2I) flows into the system ground terminal GND to form a current loop.

Figure 12:
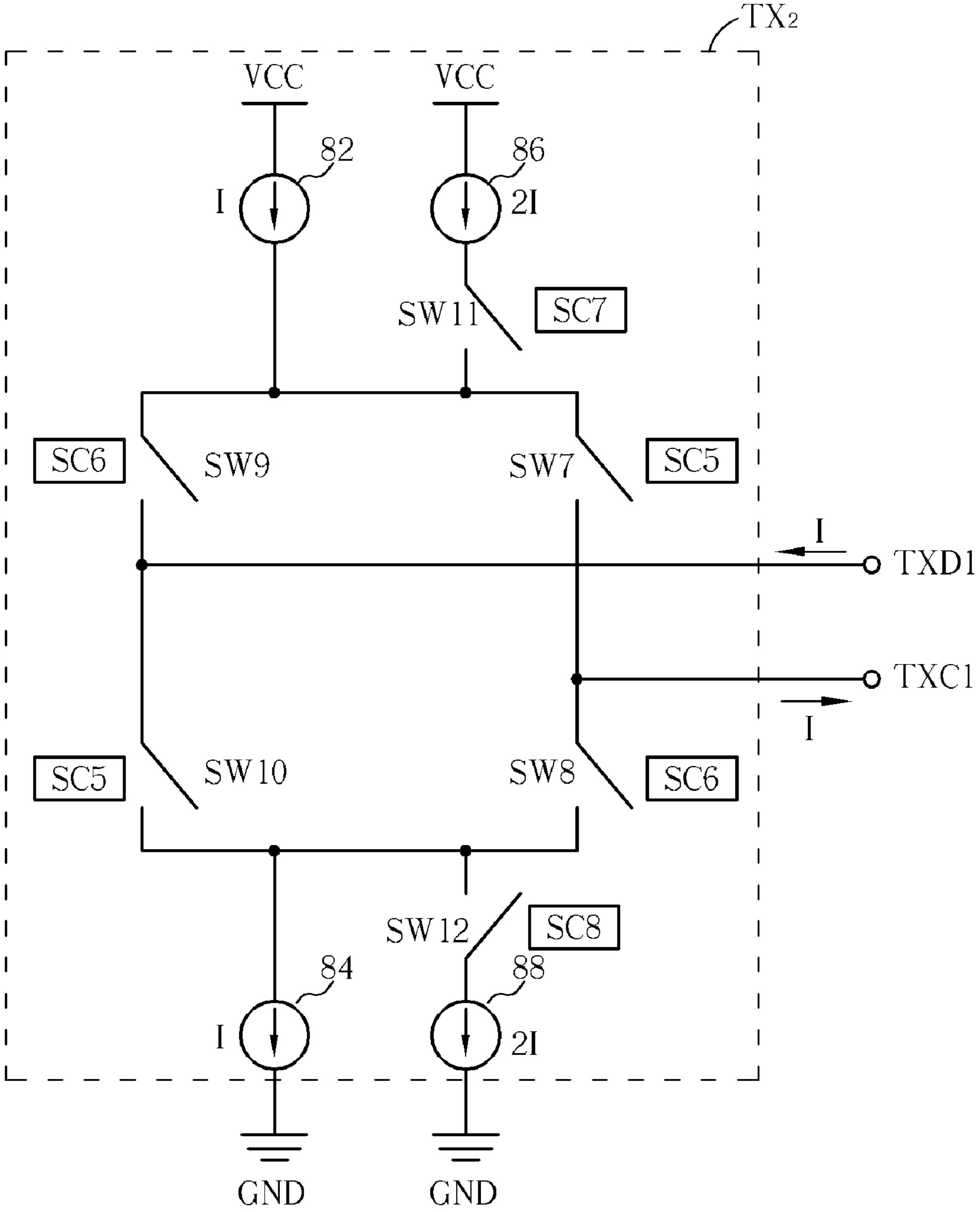
FIG. 12 is a diagram illustrating an internal current driving manner of the second transmitter in FIG. 5.

Please refer to FIG. 12 and FIG. 5. FIG. 12 is a diagram illustrating an internal current driving manner of the second transmitter $TX_2$ in FIG. 5. The second transmitter $TX_2$ includes a first current source 82, a second current source 84, a third current source 86, a fourth current source 88, a seventh switch SW7, an eighth switch SW8, a ninth switch SW9, a tenth switch SW10, an eleventh switch SW11, and a twelfth switch SW12. The third output node TXC1 is coupled between the seventh switch SW7 and the eighth switch SW8, and the fourth output node TXD1 is coupled between the ninth switch SW9 and the tenth switch SW10. The first current source 82 is coupled to the supply voltage terminal VCC for providing the current I, and the second current source 84 is coupled to the system ground terminal GND for providing a current having the same magnitude but opposite electrode with the current I. The third current source 86 is coupled to the supply voltage terminal VCC for providing a current 21, and the fourth current source 88 is coupled to the system ground terminal GND for providing a current having the same magnitude but opposite electrode with the current 21. The seventh switch SW7 is controlled by a fifth control signal SC5. The eighth switch SW8 is coupled to the seventh switch SW7 and is controlled by a sixth control signal SC6. The ninth switch SW9 is coupled to the first current source 82 and is controlled by the sixth control signal SC6. The tenth switch SW10 is coupled between the ninth switch SW9 and the second current source 84 and is controlled by the fifth control signal SC5. The eleventh switch SW11 is coupled between the third current source 86 and the seventh switch SW7 and is controlled by a seventh control signal SC7. The twelfth switch SW12 is coupled between the eighth switch SW8 and the fourth current source 88 and is controlled by an eighth control signal SC8. The fifth control signal SC5 and the sixth control signal SC6 are complementary signals. The seventh control signal SC7 and the third control signal SC3 are complementary signals. The eighth control signal SC8 and the fourth control signal SC4 are complementary signals.

Please keep referring to FIG. 12. The seventh switch SW7 and the tenth switch SW10 are turned on, and the ninth switch SW9, the eighth switch SW8, the eleventh switch SW11, and the twelfth switch SW12 are turned off when the fifth control signal SC5 is high level and the sixth control signal SC6, the seventh control signal SC7, and the eighth control signal SC8 are low level. The supply voltage VCC outputs the current I, and then the current I flows through the seventh switch SW7 and draws out from the third output node TXC1. The current I flows into the fourth output node TXD1 through external termination resistors $RT_1$ (please refer to FIG. 5) and then flows through the tenth switch SW10. Finally, the current I flows into the system ground terminal GND to form a current loop. Oppositely, the ninth switch SW9 and the eighth switch SW8 are turned on, and the seventh switch SW7, the tenth switch SW10, the eleventh switch SW11, and the twelfth switch SW12 are turned off when the sixth control signal SC6 is high level and the fifth control signal SC5, the seventh control signal SC7, and the eighth control signal SC8 are low level. The supply voltage VCC outputs the current I, and then the current I flows through the ninth switch SW9 and draws out from the fourth output node TXD1. The current I flows into the third output node TXC1 through external termination resistors $RT_1$ (please refer to FIG. 5) and then flows through the eighth switch SW8. Finally, the current I flows into the system ground terminal GND to form a current loop.

Please refer to FIG. 11, FIG. 12, and FIG. 13. FIG. 13 is a diagram illustrating the control signals in FIG. 11 and in FIG. 12. In this embodiment, the first control signal SC1 and the second control signal SC2 are complementary signals, the fifth control signal SC5 and the sixth control signal SC6 are complementary signals, the seventh control signal SC7 and the third control signal SC3 are complementary signals, and the eighth control signal SC8 and the fourth control signal SC4 are complementary signals. As shown in FIG. 13, when a clock signal Clock=1, data signals Data[1] and Data[0] have four combinations which can carry a data amount of two bits. When the clock signal Clock=0, the data signals Data[1] and Data[0] have four combinations which can carry a data amount of two bits. As a result, the driving device 50 can carry a data amount of four bits within a clock period. The first control signal SC1, the second control signal SC2, the third control signal SC3, the fourth control signal SC4, the fifth control signal SC5, the sixth control signal SC6, the seventh control signal SC7, and the eighth control signal SC8 are generated based on encoding a display data.

Figure 14:
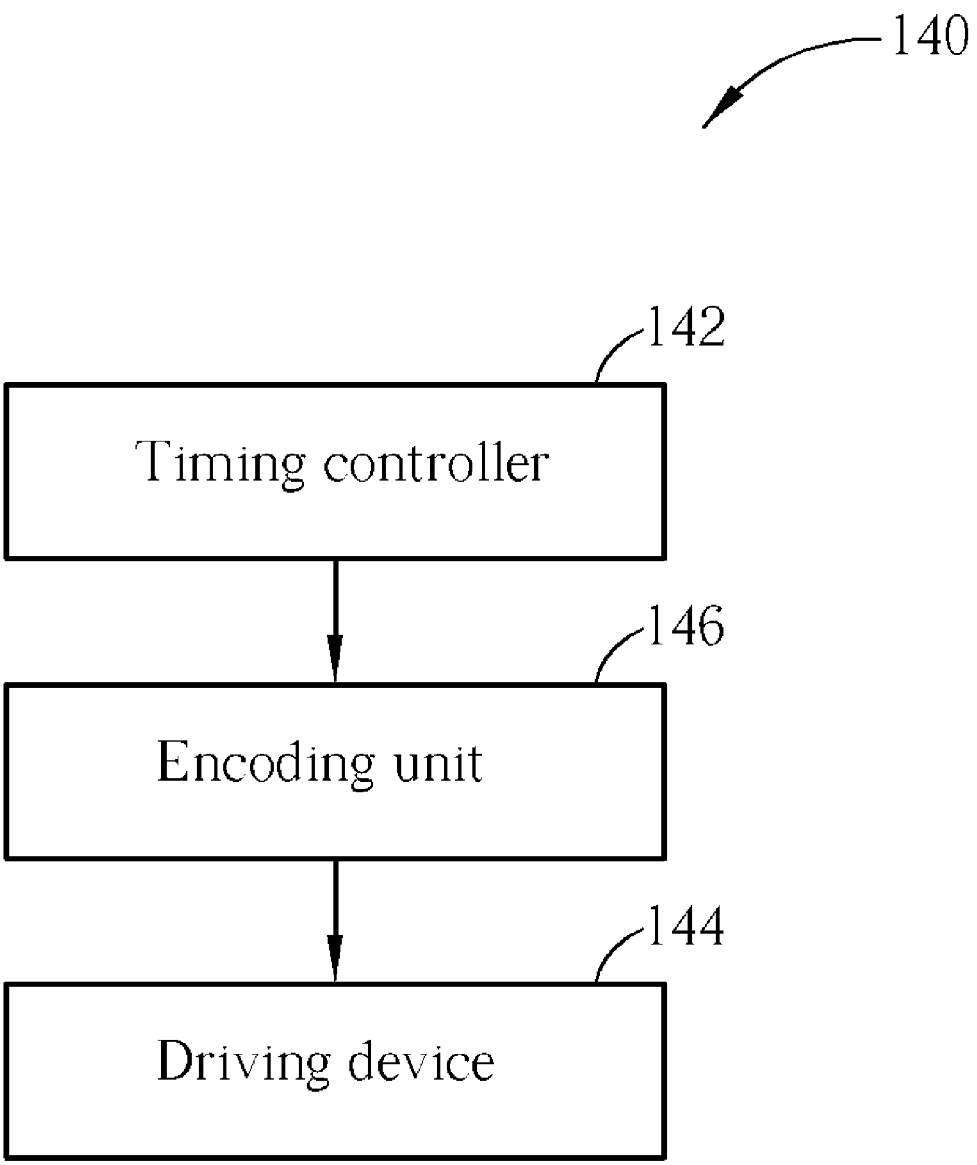
FIG. 14 is a diagram of an image transmission device according to an embodiment of the present invention.

Please refer to FIG. 5, FIG. 13, and FIG. 14. FIG. 14 is a diagram of an image transmission device 140 according to an embodiment of the present invention. The image transmission device 140 includes a timing controller 142, a driving device 144, and an encoding unit 146. The timing controller 142 is used for generating data signals, control signals, and clock signals of the image transmission device 140. The driving device 144 can be the driving device 50 in FIG. 5 which includes a plurality of transmitters (in this embodiment, two transmitters are adopted for illustration). The encoding unit 146 is coupled between the timing controller 142 and the driving device 144 for generating the first control signal SC1, the second control signal SC2, the third control signal SC3, the fourth control signal SC4, the fifth control signal SC5, the sixth control signal SC6, the seventh control signal SC7, and the eighth control signal SC8 according to a display data of the timing controller 142. These control signals are used for controlling turning on and off the switches inside the driving device 144 and their relationship can refer to the table in FIG. 13. The first control signal SC1 and the second control signal SC2 are complementary signals, the fifth control signal SC5 and the sixth control signal SC6 are complementary signals, the seventh control signal SC7 and the third control signal SC3 are complementary signals, and the eighth control signal SC8 and the fourth control signal SC4 are complementary signals.

The abovementioned embodiments are presented merely for describing the present invention, and in no way should be considered to be limitations of the scope of the present invention. The driving device 50 includes the first transmitter $TX_1$ and the second transmitter $TX_2$, but the number of the transmitters is not limited to two only and can also be extended to four or even 2n. The currents provided by the first current source 72 and 82, and the second current source 74 and 84 can be adjusted depending on user's demands. Furthermore, the first control signal SC1, the second control signal SC2, the third control signal SC3, the fourth control signal SC4, the fifth control signal SC5, the sixth control signal SC6, the seventh control signal SC7, and the eighth control signal SC8 are generated based on encoding a display data of the timing controller and can be adjusted based on circuit's demands.

From the above descriptions, the present invention provides a driving device 50 and related image transmission device 140 of a flat panel display. The driving device 50 utilizes two (or 2n) transmitters to transmit data at the same time that can raise the data amount to double (or 2n). The magnitude and the direction of the currents provided by the first current source 72 and 82, and the second current source 74 and 84 can be adjusted depending on user's demands. Therefore, not only can the data amount be raised easily, but also the circuit layout can be simplified to lower cost of panel manufacture.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A driving device of a flat panel display, the driving device comprising a plurality of transmitters, each transmitter comprising:

a first current source used for providing a first current;

a second current source used for providing a second current;

a third current source used for providing a third current;

a fourth current source used for providing a fourth current;

a first switch controlled by a first control signal;

a second switch coupled to the first switch and controlled by a second control signal;

a third switch coupled to the first current source and controlled by the second control signal;

a fourth switch coupled between the third switch and the second current source and controlled by the first control signal;

a fifth switch coupled between the third current source and the first switch and controlled by a third control signal; and a sixth switch coupled between the second switch and the fourth current source and controlled by a fourth control signal;

wherein the plurality of transmitters at least comprises a first transmitter and a second transmitter, the third control signal applied to the first transmitter and the third control signal applied to the second transmitter are complementary signals, and the fourth control signal applied to the first transmitter and the fourth control signal applied to the second transmitter are complementary signals.

2. The driving device of claim 1 wherein each transmitter of the plurality of transmitters further comprises:

a first output node coupled between the first switch and the second switch; and a second output node coupled between the third switch and the fourth switch.

3. The driving device of claim 2 wherein each transmitter of the plurality of transmitters flirt her comprises two terminal resistors externally connected which are coupled between the first output node and the second output node in series.

4. The driving device of claim 1 wherein the driving device comprises (2n) transmitters being disposed in parallel, and n is a positive integer.

5. The driving device of claim 4 wherein the driving device is capable of carrying a data amount of at least four bits within a clock period.

6. The driving device of claim 1 further comprises an encoding unit for generating the first control signal, the second control signal, the third control signal, and the fourth control signal according to a display data.

7. The driving device of claim 1 wherein the first control signal and the second control signal are complementary signals.

8. A driving device of a flat panel display, the driving device comprising a plurality of transmitters, each transmitter comprising:

a first current source used for providing a first current;

a second current source used for providing a second current;

a third current source used for providing a third current;

a fourth current source used for providing a fourth current;

a first switch controlled by a first control signal;

a second switch coupled to the first switch and controlled by a second control signal;

a third switch coupled to the first current source and controlled by the second control signal;

a fourth switch coupled between the third switch and the second current source and controlled by the first control signal;

a fifth switch coupled between the third current source and the first switch and controlled by a third control signal; and a sixth switch coupled between the second switch and the fourth current source and controlled by a fourth control signal;

wherein the first current and the second current have the same magnitude but opposite electrodes.

9. A driving device of a flat panel display, the driving device comprising a plurality of transmitters, each transmitter comprising:

a first current source used for providing a first current;

a second current source used for providing a second current;

a third current source used for providing a third current;

a fourth current source used for providing a fourth current;

a first switch controlled by a first control signal;

a second switch coupled to the first switch and controlled by a second control signal;

a third switch coupled to the first current source and controlled by the second control signal;

a fourth switch coupled between the third switch and the second current source and controlled by the first control signal;

a fifth switch coupled between the third current source and the first switch and controlled by a third control signal; and a sixth switch coupled between the second switch and the fourth current source and controlled by a fourth control signal;

wherein the third current and the fourth current have the same magnitude but opposite electrodes.

10. A driving device of a flat panel display, the driving device comprising a plurality of transmitters, each transmitter comprising:

a first current source used for providing a first current;

a second current source used for providing a second current;

a third current source used for providing a third current;

a fourth current source used for providing a fourth current;

a first switch controlled by a first control signal;

a second switch coupled to the first switch and controlled by a second control signal;

a third switch coupled to the first current source and controlled by the second control signal;

a fourth switch coupled between the third switch and the second current source and controlled by the first control signal;

a fifth switch coupled between the third current source and the first switch and controlled by a third control signal; and a sixth switch coupled between the second switch and the fourth current source and controlled by a fourth control signal;

wherein the magnitude of the third current is not equal to the magnitude of the first current.

11. A driving device of a flat panel display, the driving device comprising a plurality of transmitters, each transmitter comprising:

a first current source used for providing a first current;

a second current source used for providing a second current;

a third current source used for providing a third current;

a fourth current source used for providing a fourth current;

a first switch controlled by a first control signal;

a second switch coupled to the first switch and controlled by a second control signal;

a third switch coupled to the first current source and controlled by the second control signal;

a fourth switch coupled between the third switch and the second current source and controlled by the first control signal;

a fifth switch coupled between the third current source and the first switch and controlled by a third control signal; and a sixth switch coupled between the second switch and the fourth current source and controlled by a fourth control signal;

wherein the magnitude of the third current is twice as big as the magnitude of the first current.

12. An image transmission device comprising:

a timing controller;

a driving device comprising a plurality of transmitters, each transmitter comprising:

a first current source used for providing a first current;

a second current source used for providing a second current;

a third current source used for providing a third current;

a fourth current source used for providing a fourth current;

a first switch controlled by a first control signal;

a second switch coupled to the first switch and controlled by a second control signal;

a third switch coupled to the first current source and controlled by the second control signal;

a fourth switch coupled between the third switch and the second current source and controlled by the first control signal;

a fifth switch coupled between the third current source and the first switch and controlled by the third control signal; and a sixth switch coupled between the second switch and the fourth current source and controlled by a fourth control signal;

wherein the plurality of transmitters at least comprises a first transmitter and a second transmitter, the third control signal applied to the first transmitter and the third control signal applied to the second transmitter are complementary signals, and the fourth control signal applied to the first transmitter and the fourth control signal applied to the second transmitter are complementary signals; and an encoding unit coupled between the timing controller and the driving device for generating the first control signal, the second control signal, the third control signal, and the fourth control signal according to a display data of the timing controller.

13. The image transmission device of claim 12 wherein each transmitter of the plurality of transmitters further comprises:

a first output node coupled between the first switch and the second switch; and a second output node coupled between the third switch and the fourth switch.

14. The image transmission device of claim 13 wherein each transmitter of the plurality of transmitters further comprises two terminal resistors externally connected which are coupled between the first output node and the second output node in series.

15. The image transmission device of claim 12 wherein the driving device comprises (2n) transmitters being disposed in parallel, and n is a positive integer.

16. The image transmission device of claim 15 wherein the driving device is capable of carrying a data amount of at least four bits within a clock period.

17. The image transmission device of claim 12 wherein the first control signal and the second control signal are complementary signals.

18. An image transmission device comprising:

a timing controller;

a driving device comprising a plurality of transmitters, each transmitter comprising:

a first current source used for providing a first current;

a second current source used for providing a second current;

a third current source used for providing a third current;

a fourth current source used for providing a fourth current;

a first switch controlled by a first control signal;

a second switch coupled to the first switch and controlled by a second control signal;

a third switch coupled to the first current source and controlled by the second control signal;

a fourth switch coupled between the third switch and the second current source and controlled by the first control signal;

a fifth switch coupled between the third current source and the first switch and controlled by the third control signal; and a sixth switch coupled between the second switch and the fourth current source and controlled by a fourth control signal; and an encoding unit coupled between the timing controller and the driving device for generating the first control signal, the second control signal, the third control signal, and the fourth control signal according to a display data of the timing controller;

wherein the first current and the second current have the same magnitude but opposite electrodes.

19. An image transmission device comprising:

a timing controller;

a driving device comprising a plurality of transmitters, each transmitter comprising:

a first current source used for providing a first current;

a second current source used for providing a second current;

a third current source used for providing a third current;

a fourth current source used for providing a fourth current;

a first switch controlled by a first control signal;

a second switch coupled to the first switch and controlled by a second control signal;

a third switch coupled to the first current source and controlled by the second control signal;

a fourth switch coupled between the third switch and the second current source and controlled by the first control signal;

a fifth switch coupled between the third current source and the first switch and controlled by the third control signal; and a sixth switch coupled between the second switch and the fourth current source and controlled by a fourth control signal; and an encoding unit coupled between the timing controller and the driving device for generating the first control signal, the second control signal, the third control signal, and the fourth control signal according to a display data of the timing controller;

wherein the third current and the fourth current have the same magnitude but opposite electrodes.

20. An image transmission device comprising:

a timing controller;

a driving device comprising a plurality of transmitters, each transmitter comprising:

a first current source used for providing a first current;

a second current source used for providing a second current;

a third current source used for providing a third current;

a fourth current source used for providing a fourth current;

a first switch controlled by a first control signal;

a second switch coupled to the first switch and controlled by a second control signal;

a third switch coupled to the first current source and controlled by the second control signal;

a fourth switch coupled between the third switch and the second current source and controlled by the first control signal;

a fifth switch coupled between the third current source and the first switch and controlled by the third control signal; and a sixth switch coupled between the second switch and the fourth current source and controlled by a fourth control signal; and an encoding unit coupled between the timing controller and the driving device for generating the first control signal, the second control signal, the third control signal, and the fourth control signal according to a display data of the timing controller;

wherein the magnitude of the third current is twice as big as the magnitude of the first current.

* * * * *